(12) United States Patent
Sato et al.

(10) Patent No.: US 8,840,823 B2
(45) Date of Patent: Sep. 23, 2014

(54) METHOD FOR PRODUCING POLYGLYCOLIC ACID FIBER

(75) Inventors: Hiroyuki Sato, Tokyo (JP); Masahiro Yamazaki, Tokyo (JP); Ryo Kato, Tokyo (JP); Moriaki Arasaki, Tokyo (JP); Kotaku Saigusa, Tokyo (JP)

(73) Assignee: Kureha Corporation, Tokyo (JP)

( * ) Notice: Subject to any disclaimer, the term of this patent is extended or adjusted under 35 U.S.C. 154(b) by 191 days.

(21) Appl. No.: 13/376,710

(22) PCT Filed: May 24, 2010

(86) PCT No.: PCT/JP2010/058763
§ 371 (c)(1),
(2), (4) Date: Dec. 7, 2011

(87) PCT Pub. No.: WO2010/143526
PCT Pub. Date: Dec. 16, 2010

(65) Prior Publication Data
US 2012/0086147 A1    Apr. 12, 2012

(30) Foreign Application Priority Data
Jun. 8, 2009    (JP) .................................. 2009-137247

(51) Int. Cl.
| | |
|---|---|
| D01D 5/08 | (2006.01) |
| D01D 5/26 | (2006.01) |
| D01D 10/04 | (2006.01) |
| D02J 1/22 | (2006.01) |
| D01F 6/62 | (2006.01) |

(52) U.S. Cl.
CPC ................. D01F 6/625 (2013.01); D02J 1/228 (2013.01); D01D 10/0409 (2013.01)
USPC .................... 264/143; 264/210.8; 264/211.12

(58) Field of Classification Search
USPC ............ 264/143, 210.1, 210.7, 210.8, 211.12
See application file for complete search history.

(56) References Cited

U.S. PATENT DOCUMENTS

| | | | | |
|---|---|---|---|---|
| 3,886,722 | A | * | 6/1975 | Hori et al. ........................ 57/288 |
| 5,133,739 | A | * | 7/1992 | Bezwada et al. ............... 606/230 |
| 5,288,516 | A | * | 2/1994 | Anderson et al. ............. 427/171 |
| 6,495,254 | B1 | | 12/2002 | Abe et al. |
| 6,763,559 | B2 | * | 7/2004 | Edens ........................ 264/210.8 |
| 2006/0100392 | A1 | | 5/2006 | Yamane et al. |
| 2009/0053521 | A1 | * | 2/2009 | Goda et al. .................... 428/362 |

FOREIGN PATENT DOCUMENTS

| | | |
|---|---|---|
| JP | A-2001-336028 | 12/2001 |
| JP | A-2005-307427 | 11/2005 |
| JP | A-2005-350829 | 12/2005 |

(Continued)

OTHER PUBLICATIONS

Jan. 17, 2012 International Preliminary Report on Patentability issued in International Patent Application No. PCT/JP2010/058763.

(Continued)

*Primary Examiner* — Leo B Tentoni
(74) *Attorney, Agent, or Firm* — Oliff PLC

(57) ABSTRACT

A method for producing a polyglycolic acid fiber, including: obtaining undrawn yarns by melt spinning a polyglycolic acid resin; keeping the undrawn yarns under a temperature condition of 1 to 20° C.; obtaining drawn yarns by drawing the kept undrawn yarns; and, if necessary obtaining a staple fiber by cutting the drawn yarns.

8 Claims, 2 Drawing Sheets

(56) References Cited

FOREIGN PATENT DOCUMENTS

| JP | A-2006-22445 | 1/2006 |
| JP | A-2007-70750 | 3/2007 |
| JP | A-2008-174898 | 7/2008 |
| TW | 200427775 A | 12/2004 |
| WO | WO 00/55403 A1 | 9/2000 |
| WO | WO-2005080658 A1 * | 9/2005 |

OTHER PUBLICATIONS

International Search Report dated Jun. 15, 2010 in International Application No. PCT/3P2010/058763 (with translation).

* cited by examiner

METHOD FOR PRODUCING POLYGLYCOLIC ACID FIBER

TECHNICAL FIELD

The present invention relates to a method for producing a polyglycolic acid fiber, and more specifically to a method for producing a polyglycolic acid fiber, comprising a step of keeping undrawn yarns obtained for melt spinning process of polyglycolic acid resin.

BACKGROUND ART

Fibers made of polyglycolic acid have been used as fibers having biodegradability and bioabsorbability in various fields such as the medical field, and have been conventionally produced by spin-drawn yarn method (SDY method). In the SDY method, however, the drawing is conducted after spinning without winding. Hence, if yarn break or the like occurs during the drawing, a large amount of resin is discharged in the spinning step. Accordingly, the SDY method is inefficient for mass-production, and it is not easy to reduce the production costs of polyglycolic acid fibers. For this reason, the applications of polyglycolic acid fibers are limited to those in special and high value added fields, such as surgical sutures.

On the other hand, polyolefin fibers, nylon fibers, polylactic acid fibers, and the like are produced in such a manner that undrawn yarns after spinning are once wound or put in cans to be kept, and then drawn (see, for example, Japanese Unexamined Patent Application Publication No. 2005-350829 (PTL 1), Japanese Unexamined Patent Application Publication No. 2006-22445 (PTL 2), Japanese Unexamined Patent Application Publication No. 2007-70750 (PTL 3), Japanese Unexamined Patent Application Publication No. 2008-174898 (PTL 4), and Japanese Unexamined Patent Application Publication No. 2005-307427 (PTL 5)). In this method, the spun undrawn yarns can be drawn in a bundle, and the spinning step and the drawing step are each independently conducted, because it is unnecessary to draw yarns immediately after the spinning. Hence, this method achieves a high productivity, and is suitable for mass-production.

However, production of a polyglycolic acid fiber by this method involves a problem that undrawn yarns of polyglycolic acid wound or put in cans agglutinate during the keeping, and the undrawn yarns are difficult to release, so that the undrawn yarns cannot be drawn.

CITATION LIST

Patent Literature

[PTL 1] Japanese Unexamined Patent Application Publication No. 2005-350829
[PTL 2] Japanese Unexamined Patent Application Publication No. 2006-22445
[PTL 3] Japanese Unexamined Patent Application Publication No. 2007-70750
[PTL 4] Japanese Unexamined Patent Application Publication No. 2008-174898
[PTL 5] Japanese Unexamined Patent Application Publication No. 2005-307427

SUMMARY OF INVENTION

Technical Problem

The present invention has been made in view of the above-described problems of the conventional technologies, and an object of the present invention is to provide a method for producing a polyglycolic acid fiber, in which, even when undrawn yarns obtained by spinning a polyglycolic acid resin are kept for a long time, no agglutination occurs, and the undrawn yarns can be released and drawn relatively easily.

Solution to Problem

The present inventors have conducted earnest study to achieve the above-described object. As a result, the present inventors have found the following facts. Specifically, when undrawn yarns obtained by spinning a polyglycolic acid resin are kept, the glass transition temperature (Tg) of the undrawn yarns of the polyglycolic acid whose amorphous region is highly orientated is lowered with time under high temperature and high humidity. As a result, the undrawn yarns shrink, and the agglutination occurs. Moreover, as the keeping temperature is higher, the tendency that the Tg is lowered is increased. These findings have lead to the completion of the present invention.

Specifically, a method for producing a polyglycolic acid fiber of the present invention comprises the steps of: obtaining undrawn yarns by melt spinning a polyglycolic acid resin; keeping the undrawn yarns under a temperature condition of 1 to 20° C.; and obtaining drawn yarns by drawing the kept undrawn yarns. A keeping time in the storing step is preferably 3 hours or more from the viewpoint of productivity.

The method for producing a polyglycolic acid fiber of the present invention may further comprise a step of obtaining a staple fiber by cutting the drawn yarns.

Meanwhile, a method for keeping undrawn polyglycolic acid resin yarns of the present invention comprises a step of keeping undrawn yarns, which are obtained by melt spinning a polyglycolic acid resin, under a temperature condition of 1 to 20° C.

Note that, in the present invention, the drawn yarns and the staple fiber may also be referred to collectively as a "polyglycolic acid fiber". Moreover, in the present invention, the "releasing" of undrawn yarns means that the undrawn yarns are released enough to be draw, and specifically means that undrawn yarns wound on a bobbin or put in a cans are released to a drawable unit (for example, individual yarn).

Although it is not exactly clear why the undrawn yarns of polyglycolic acid are less likely to agglutinate in the production method of the present invention, the present inventors speculate as follows. Specifically, a polyglycolic acid resin has higher water absorbability than other polyester resins such as polylactic acid, and is likely to absorb water during the spinning and during the application of an oiling agent to the undrawn yarns. The Tg of the undrawn yarns of polyglycolic acid thus absorbing water tends to be lowered with time during keeping, and the tendency is increased as the keeping temperature is increased. The undrawn yarns whose Tg is lowered to around the keeping temperature shrink, and the single yarns are pressure bonded to each other to agglutinate.

In the production method of the present invention, since the keeping is conducted at relatively low temperature, the lowering of Tg with time itself is small. In addition, since the difference between the Tg and the keeping temperature is great, the Tg is less likely to be lowered to around the keeping temperature. It is presumed that, for these reasons, the shrinkage of the undrawn yarns is suppressed, and the agglutination is less likely to occur.

In contrast, if the undrawn yarns are kept under relatively high temperature conditions similar to those employed for spinning or drying, the lowering of the Tg with time is great, and the difference between the Tg and the keeping temperature is small. Hence, these act synergistically, so that the Tg is lowered to around the keeping temperature in a short period of time. It is presumed that the undrawn yarns whose Tg is lowered to around the keeping temperature has a large shrinkability, so that the agglutination occurs.

On the other hand, resins having relatively low water absorbability such as polylactic acid absorb a small amount of water during the spinning and during the application of an oiling agent to the undrawn yarns, and the change in Tg with time is less likely to occur. In addition, since such resins have higher Tg than those of polyglycolic acid resins, the shrinkage is less likely to occur even when the keeping temperature is high. Accordingly, as long as the keeping is started at temperatures lower than the Tg of the resins, the shrinkage as described above does not occur, and no agglutination of the undrawn yarns occurs.

Advantageous Effects of Invention

The present invention makes it possible to keep undrawn yarns obtained by spinning a polyglycolic acid resin for a long time without causing agglutination, and to release and draw the kept undrawn yarns relatively easily.

DESCRIPTION OF EMBODIMENTS

Figure 1:
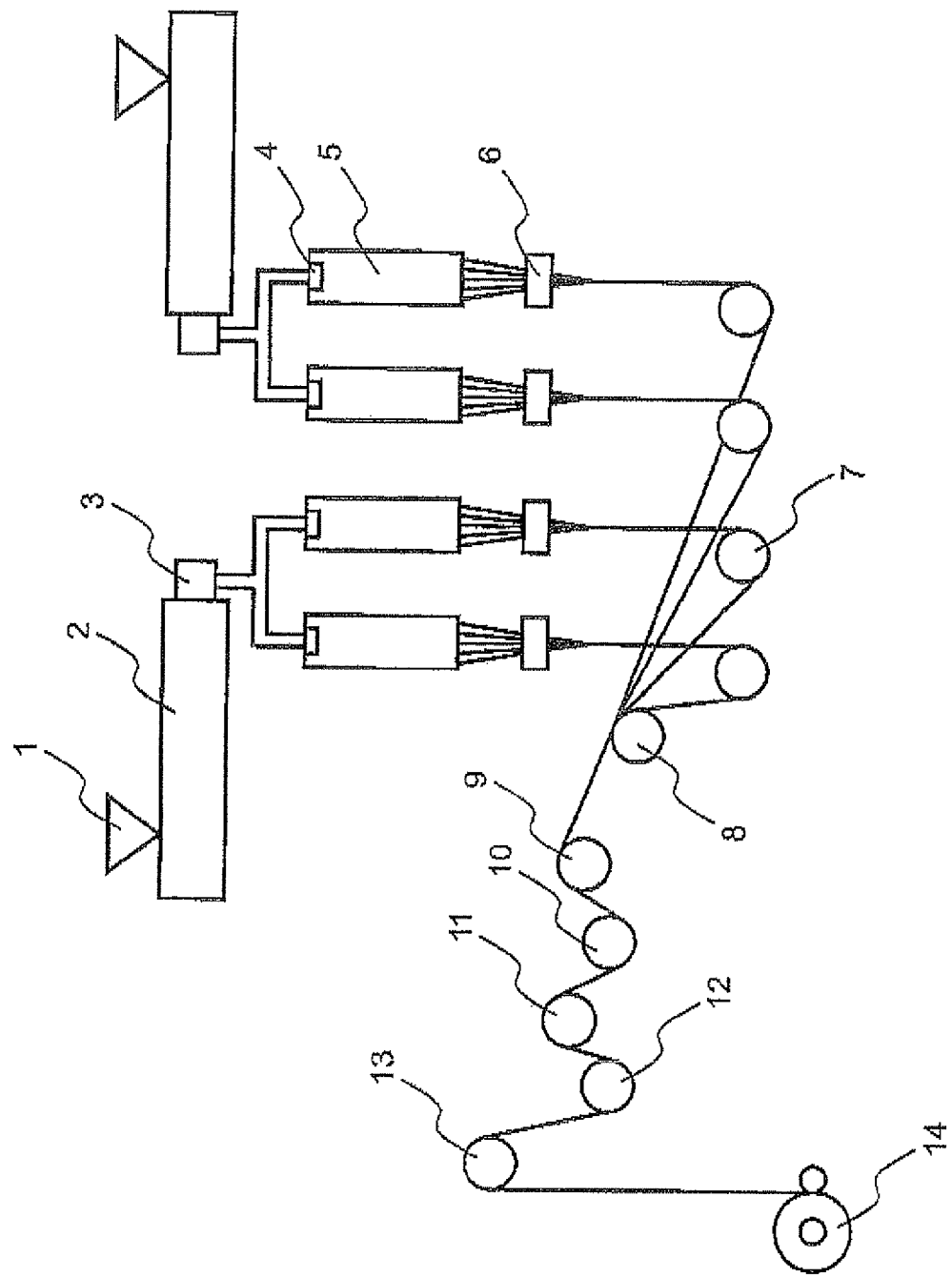
FIG. 1 is a schematic diagram showing a melt spinning apparatus used in Examples and Comparative Examples.

Hereinafter, the present invention will be described in detail on the basis of preferred embodiments thereof.

First, a polyglycolic acid resin (hereinafter referred to as the "PGA resin") used in the present invention is described. The PGA resin used in the present invention is a homopolymer of glycolic acid (hereinafter referred to as the "PGA homopolymer", the homopolymer including a ring-opening polymer of glycolide, which is a cyclic ester derived from two molecules of glycolic acid) constituted of only a glycolic acid repeating unit represented by the following formula (1):

$$-[O-CH_2-C(=O)]- \qquad (1).$$

Examples of a catalyst used when the PGA resin is produced by ring-opening polymerization of glycolide include known ring-opening polymerization catalysts including tin-based compounds such as tin halides and organic tin carboxylates; titanium-based compounds such as alkoxy titanates; aluminum-based compounds such as alkoxy aluminums; zirconium-based compounds such as zirconium acetylacetonate; and antimony-based compounds such as antimony halide and antimony oxides.

The PGA resin can be produced by a known polymerization method. A temperature for the polymerization is preferably 120 to 300° C., more preferably 130 to 250° C., particularly preferably 140 to 220° C., and most preferably 150 to 200° C. If the polymerization temperature is lower than the lower limit, the polymerization tends to proceed insufficiently. Meanwhile, if the polymerization temperature exceeds the upper limit, the produced resin tends to be decomposed.

Meanwhile, a time for the polymerization of the PGA resin is preferably 2 minutes to 50 hours, more preferably 3 minutes to 30 hours, and particularly preferably 5 minutes to 18 hours. If the polymerization time is less than the lower limit, the polymerization tends to proceed insufficiently. Meanwhile, if the polymerization time exceeds the upper limit, the produced resin tends to be too colored.

The PGA resin has a weight average molecular weight of preferably $5 \times 10^4$ to $80 \times 10^4$, and more preferably $8 \times 10^4$ to $50 \times 10^4$. If the weight average molecular weight of the PGA resin is less than the lower limit, the mechanical strength of the PGA fiber tends to be low, and the fiber tends to be easily broken. Meanwhile, if the weight average molecular weight exceeds the upper limit, the melt viscosity tends to be high, and the spinning of the PGA fiber tends to be difficult. Note that the weight average molecular weight is determined by gel permeation chromatography (GPC) relative to polymethyl methacrylate.

In addition, the PGA resin has a melt viscosity (temperature: 240° C.; shear rate: 122 $sec^{-1}$) of preferably 1 to 10000 Pa·s, more preferably 100 to 6000 Pa·s, and particularly preferably 300 to 4000 Pa·s. If the melt viscosity is less than the lower limit, the mechanical strength of the PGA fiber tends to be low, and the fiber tends to be easily broken. Meanwhile, if the melt viscosity exceeds the upper limit, the spinning of the the PGA fiber tends to be difficult.

In the present invention, the PGA resin may be used as it is, or as a PGA-based resin composition, which is obtained by adding, to the PGA resin, various additives such as a thermal stabilizer, an end-capping agent, a plasticizer, and a heat ray absorber, and other thermoplastic resins, if necessary.

Next, a method for producing a PGA fiber of the present invention is described. The method for producing a PGA fiber of the present invention comprises the steps of: obtaining undrawn PGA yarns by melt spinning a PGA resin; keeping the undrawn PGA yarns under a temperature condition of 1 to 20° C.; and obtaining drawn PGA yarns by drawing the kept undrawn yarns. Moreover, a PGA staple fiber can be produced by cutting drawn PGA yarns obtained by this method.

In the present invention, the undrawn PGA yarns are obtained by first melting the PGA resin, and subsequently spinning the melted PGA resin. A known method can be employed as such a melt spinning method.

In the present invention, a temperature for the melting of the PGA resin is preferably 230 to 300° C., and more preferably 250 to 280° C. If the temperature for the melting of the PGA resin is lower than the lower limit, the extrusion flowability of the PGA resin tends to be low, so that the PGA resin is not discharged from a nozzle, and the spinning thereof tends to be difficult. Meanwhile, if the temperature exceeds the upper limit, the PGA resin tends to be too colored, or.

Examples of the method for obtaining undrawn yarns by spinning the melted PGA resin include known methods such as a method in which the melted PGA resin is formed in the shape of a yarn by being discharged through a spinning nozzle, and then solidified by cooling. The spinning nozzle is not particularly limited, but a known spinning nozzle can be used. The number of the holes of the nozzle, and the diameters of the holes are not particularly limited. Moreover, a method for the cooling is not particularly limited, but air cooling is preferable because of the simplicity and convenience.

Next, the thus obtained undrawn PGA yarns are taken up by a roller or the like, and kept. As described above, after the PGA resin is spun, the obtained undrawn yarns are kept, and then drawn in a bundled state, whereby the production efficiency of the PGA fiber can be improved, so that the PGA fiber can be produced at low costs.

A method for storing the undrawn PGA yarns is not particularly limited. Examples of the method include a method in which the taken-up undrawn PGA yarns are kept after wound on a bobbin or the like, or after put in a coiler can or the like.

The take-up speed (the peripheral speed of the roller) is preferably 100 to 4000 m/min, and more preferably 1000 to 2000 m/min. If the take-up speed is less than the lower limit, the PGA tends to be crystallized, making it difficult to draw the undrawn yarns. Meanwhile, if the take-up speed exceeds the upper limit, partial orientation and crystallization tend to proceed, so that the draw ratio tends to be low, and also the strength tends to be low.

In addition, in the present invention, the undrawn PGA yarns after the solidification by cooling may be directly taken up as described above. However, in order to improve the releasing property during drawing, an oiling agent for fiber is preferably applied to the undrawn PGA yarns, before the undrawn PGA yarns are taken up by a roller or the like.

In the present invention, a temperature for the keeping of the undrawn PGA yarns is 1 to 20° C. If the keeping temperature is lower than 1° C., the temperature is too low to be practical. Meanwhile, if the keeping temperature exceeds 20° C., the lowering of the glass transition temperature (Tg) of the undrawn PGA yarns with time occurs in a short period of time, and the agglutination of the undrawn PGA yarns occurs, making it difficult to draw the undrawn PGA yarns. In addition, in a case where the keeping temperature exceeds 15° C. and is less than 20° C., when the undrawn PGA yarns are kept for a long time (for example, 6 hours or more), although the agglutination does not occur, the releasing property may be partially lacking in uniformity, so that single yarn break may occur during the drawing. Accordingly, from the viewpoints that no agglutination occurs, the releasing property is uniform and good, and the drawing can be conducted easily, the keeping temperature is preferably 1 to 15° C.

In the present invention, the keeping time of the undrawn PGA yarns is not particularly limited. From the viewpoint that the effects of the present invention are remarkably exhibited, the production method of the present invention is preferably applied to a case where the undrawn PGA yarns are stored for 3 hours or more (more preferably 6 hours or more).

In addition, in the present invention, the storage is conducted preferably so that the Tg of undrawn PGA yarns 3 hours after (preferably 6 hours after) the start of the keeping can be 35° C. or above, and more preferably so that the Tg can be 38° C. or above. If the Tg of the undrawn PGA yarns after the keeping is lower than the lower limit, the agglutination due to shrinkage tends to occur.

The drawn PGA yarns can be obtained by taking out the thus keeping undrawn PGA yarns while releasing the stored undrawn PGA yarns, and then by drawing. In the present invention, the drawing temperature and the draw ratio are not particularly limited, but can be set appropriately depending on the desired physical properties and the like of the PGA fiber. For example, the drawing temperature is preferably 40 to 120° C., and the draw ratio is preferably 2.0 to 6.0.

The thus obtained drawn PGA yarns may be directly used as continuous fibers, or may be cut into a staple fiber. The cutting method is not particularly limited, but a known cutting method for producing a staple fiber can be employed.

EXAMPLES

Hereinafter, the present invention will be described more specifically on the basis of Examples and Comparative Examples. However, the present invention is not limited to Examples below.

Example 1

First, undrawn PGA yarns were prepared by using a melt spinning apparatus shown in FIG. 1. Note that, in the following descriptions and drawings, the same or corresponding components are denoted by the same reference signs, and overlapping descriptions therefor are omitted.

A pelletized PGA resin (manufactured by Kureha Corporation; weight average molecular weight: $20 \times 10^4$; melt viscosity (at a temperature of 240° C. and a shear rate of 122 $sec^{-1}$): 700 Pa·s; glass transition temperature; 43° C.; melting point: 220° C.; size: 3 mm in diameter×3 mm in length) was fed into single screw extruders 2 having a cylinder diameter of 30 mm through raw material hoppers 1, and was melted at 240 to 250° C. Here, the cylinder temperature of the extruders 2 was set to 240 to 250° C., and the head temperature, the gear pump temperature, and the spin pack temperature were set to 250° C.

The melted PGA resin was discharged through 24-hole nozzles 4 (hole diameter: 0.30 mm) at a rate of 0.51 g/min per one hole by use of gear pumps 3, and solidified into the form of yarns by cooling the discharged PGA resin in cooling towers 5 with air (at approximately 5° C.). An oiling agent for fiber (a surfactant "Delion F-168" manufactured by Takemoto Oil & Fat Co., Ltd,) was applied onto the undrawn PGA yarns. Then, the undrawn PGA yarns were taken up by first take-up rollers 7 operated at a peripheral speed of 1200 m/min. Then, through second to seventh take-up rollers 8 to 13, the undrawn PGA yarns having a single yarn fineness of 4 to 5 D were wound on a bobbin 14 at 1000 meters per one bobbin.

The bobbin on which the undrawn PGA yarns were wound was placed in a constant temperature and humidity chamber ("HPAV-120-20" manufactured by ISUZU), and was kept therein at a temperature of 5° C. and at a relative humidity of 90% RH for a predetermined time. Before and after the keeping, the undrawn PGA yarns were measured for Tg, and evaluated in terms of the releasing property (whether or not the agglutination occurred), by the following methods. Table 1 shows the results.

<Glass Transition Temperature (Tg)>

In an aluminum pan having a capacity of 160 μl, 10 mg of the undrawn PGA yarns were weighted, and mounted on a differential scanning calorimeter ("DSC-15" manufactured by Mettler Toledo International Inc.). Then, the undrawn PGA yarns were heated from −50° C. to 280° C. at 20° C./minute, and then cooled form 280° C. to 50° C. at 20° C./minute. The glass transition temperature Tg (unit: ° C.) of the undrawn PGA yarns was determined from an exothermic peak obtained during the cooling.

<Unwinding Property of Undrawn Yarns>

Figure 2:
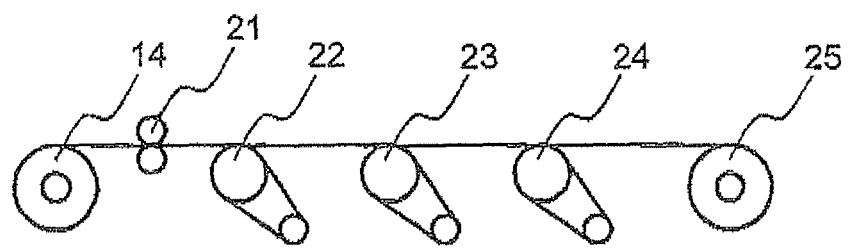
FIG. 2 is a schematic diagram showing a drawing apparatus used in Examples and Comparative Examples.

The bobbin on which the undrawn PGA yarns were wound was mounted on a drawing apparatus shown in FIG. 2. The undrawn. PGA yarns were taken out from the bobbin 14 through feeding rollers 21 by a first heating roller 22 operated at a temperature of 60° C. and a peripheral speed of 900 m/min. Then, the undrawn PGA yarns were wound on a bobbin 25 through a second heating roller 23 operated at a temperature of 85° C. and a peripheral speed of 1800 m/min and through a cooling roller 24. The releasing property of the undrawn PGA yarns at this time was evaluated on the basis of the following criteria.

A: No agglutination was observed, and the releasing property was uniform and good.

B: Although no agglutination was observed, the releasing property was partially lacking in uniformity.

C: Agglutination occurred, and the undrawn yarns were difficult to release.

Examples 2 to 4

Undrawn PGA yarns were kept for a predetermined time, in the same manner as in Example 1, except that the keeping temperatures were changed to 10° C., 15° C., and 20° C., respectively (in each case, the relative humidity was 90% RH). Before and after the keeping, the undrawn PGA yarns were measured for Tg, and evaluated in terms of the releasing property (whether or not the agglutination occurred), in the same manner as in Example 1. Table 1 shows the results.

Comparative Examples 1 and 2

Undrawn PGA yarns were kept for a predetermined period in the same manner as in Example 1, except that the keeping temperatures were changed to 30° C. and 40° C., respectively (in each case, the relative humidity was 90% RH). Before and after the keeping, the undrawn PGA yarns were measured for Tg, and evaluated in terms of the unwinding property (the presence or absence of agglutination), in the same manner as in Example 1. Table 1 shows the results.

TABLE 1

| Storage time (hr) | Ex. 1 5° C., 90% RH | | Ex. 2 10° C., 90% RH | | Ex. 3 15° C., 90% RH | | Ex. 4 20° C., 90% RH | | Comp. Ex. 1 30° C., 90% RH | | Comp. Ex. 2 40° C., 90% RH | |
|---|---|---|---|---|---|---|---|---|---|---|---|---|
| | Tg (° C.) | Unwinding property | Tg (° C.) | Unwinding property | Tg (° C.) | Unwinding property | Tg (° C.) | Unwinding property | Tg (° C.) | Unwinding property | Tg (° C.) | Unwinding property |
| 0 | 40 | A | 40 | A | 40 | A | 40 | A | 39 | A | 40 | A |
| 2 | 40 | A | 40 | A | 39 | A | 38 | A | 36 | A | 33 | C |
| 4 | 39 | A | 39 | A | 38 | A | 38 | A | 33 | C | 27 | C |
| 6 | 39 | A | 38 | A | 38 | A | 37 | B | 34 | C | 25 | C |
| 18 | 39 | A | 38 | A | 37 | A | 35 | B | 27 | C | 23 | C |

As is apparent from the results shown in Table 1, in the method for producing a PGA fiber of the present invention (Examples 1 to 4), the lowering of the Tg was hardly observed, and no agglutination was observed, even after the undrawn PGA yarns were kept for 18 hours. In contrast, in the case where the undrawn PGA yarns were kept at a temperature higher than the keeping temperature according to the present invention (Comparative Examples 1 and 2), even when the keeping temperature was 30° C., keeping without agglutination could be successfully conducted only for 2 hours, which has been suggested that mass-production is difficult.

INDUSTRIAL APPLICABILITY

As described above, according to the present invention, no agglutination occurs, even when undrawn yarns obtained by melt spinning a polyglycolic acid resin are kept. Hence, the present invention makes it possible to release and draw the undrawn yarns relatively easily.

Accordingly, the method for keeping a polyglycolic acid fiber of the present invention makes it possible to obtain undrawn yarns of a polyglycolic acid resin having an excellent releasing property after keeping. The method for producing a polyglycolic acid fiber of the present invention involving such a keeping method can improve the productivity of polyglycolic acid fibers, and is useful as a production method for mass-producing a polyglycolic acid fiber, and the like.

REFERENCE SIGNS LIST

1: raw material hopper
2: extruder
3: gear pump
4: nozzle
5: cooling tower
6: apparatus for applying oiling agent
7 to 13: first to seventh take-up rollers
14: bobbin for undrawn yarns
21: feeding roller
22: first heating roller
23: second heating roller
24: cooling roller
25: bobbin for drawn yarns

The invention claimed is:

1. A method for producing a polyglycolic acid fiber, comprising the steps of:
   obtaining undrawn yarns by melt spinning a homopolymer of glycolic acid;
   storing the undrawn yarns which are wound on a bobbin or put in a coiler can under a temperature condition of 1 to 20° C.; and
   obtaining drawn yarns by drawing the stored undrawn yarns.

2. The method for producing a polyglycolic acid fiber according to claim 1, further comprising a step of obtaining a staple fiber by cutting the drawn yarns.

3. The method for producing a polyglycolic acid fiber according to claim 1, wherein a storing time in the storing step is 3 hours or more.

4. A method for storing undrawn polyglycolic acid resin yarns, comprising a step of storing undrawn yarns, which are obtained by melt spinning a homopolymer of glycolic acid and which are wound on a bobbin or put in a coiler can, under a temperature condition of 1 to 20° C.

5. A method for producing a polyglycolic acid fiber, comprising the steps of:
   obtaining undrawn yarns by melt spinning a polyglycolic acid resin;
   storing the undrawn yarns which are wound on a bobbin or put in a coiler can under a temperature condition of 1 to 15° C.; and
   obtaining drawn yarns by drawing the stored undrawn yarns.

6. The method for producing a polyglycolic acid fiber according to claim 5, further comprising a step of obtaining a staple fiber by cutting the drawn yarns.

7. The method for producing a polyglycolic acid fiber according to claim 5, wherein a storing time in the storing step is 3 hours or more.

8. A method for storing undrawn polyglycolic acid resin yarns, comprising a step of storing undrawn yarns, which are obtained by melt spinning a polyglycolic acid resin and which are wound on a bobbin or put in a coiler can, under a temperature condition of 1 to 15° C.

* * * * *